Feb. 15, 1938. W. H. HILL 2,108,123
VEHICLE SIGNAL LIGHT
Filed Oct. 23, 1936
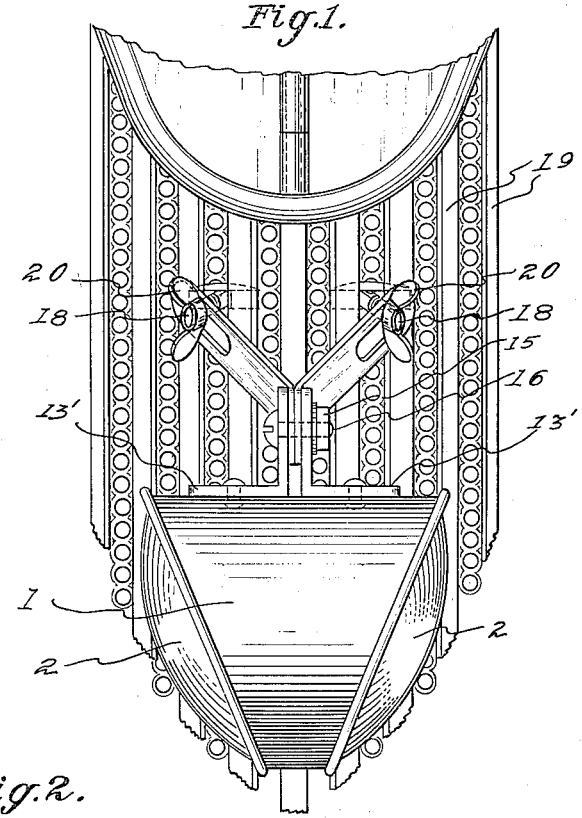
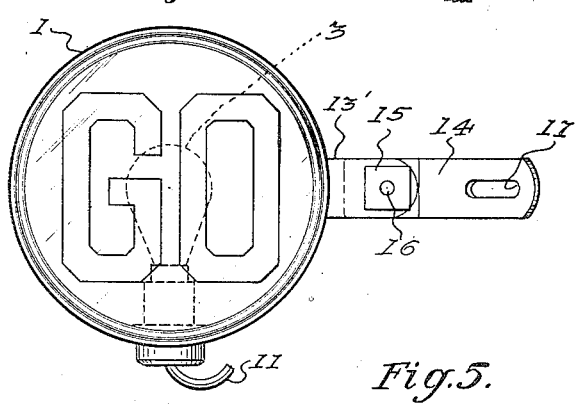
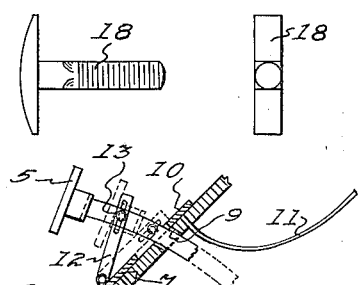
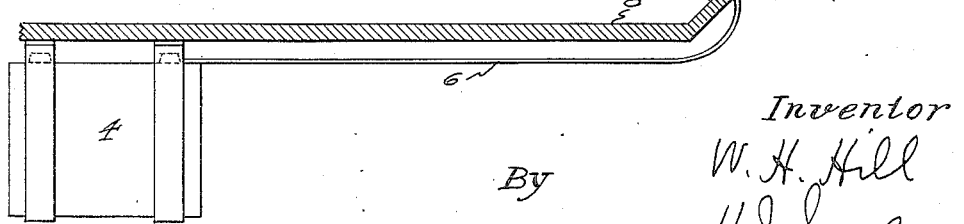
Inventor
W. H. Hill
H. J. Sanders Atty.

Patented Feb. 15, 1938

2,108,123

UNITED STATES PATENT OFFICE 2,108,123

VEHICLE SIGNAL LIGHT

Walter Hux Hill, Chicago, Ill.

Application October 23, 1936, Serial No. 107,132

1 Claim. (Cl. 177—329)

This invention relates to improvements in signal lights for automobiles and more particularly to a lamp arranged at the front end of the vehicle, preferably attached to the radiator shield as a warning light for on-coming or crossing traffic, both vehicular and pedestrian.

The lamp is intended primarily to give warning to traffic of the intention of the driver, particularly at a crossing or right of way intersection, as to whether he will stop his vehicle or continue in his course. The lamp is adapted to be operated simultaneously with the vehicle service brake and if it is the intention of the driver to stop his car the light will display a "Go" signal to the on-coming and transverse traffic and to pedestrians, whereas the absence of this signal will denote the intention of the driver to proceed.

The ordinary "stop" light at the rear of a vehicle denotes the intention of the driver to all traffic at his rear but it conveys no notice of his intention to on-coming traffic or to traffic to the right or left, nor to pedestrians who may intend to cross in front of the vehicle. It is the purpose of this signal to remedy this condition and to warn this traffic with a safety "Go" signal when the driver intends to stop, thus permitting traffic to proceed with safety.

More specifically the invention consists in the combination and arrangement of parts to be hereinafter fully set forth, pointed out in the claim and illustrated in the accompanying drawing which forms a part of this application for patent and in which—

Fig. 1 is a fragmentary view, partly in plan and partly in elevation, of a radiator and shield therefor illustrating the application of the signal light.

Fig. 2 is a view of the signal in side elevation.

Figs. 3 and 4 are side and end views of a bolt employed in securing the signal lamp to the radiator shield.

Fig. 5 is a fragmentary view of the vehicle illustrating the operating mechanism for the signal.

Like reference characters denote corresponding parts throughout the several views.

The present signal includes a lamp casing preferably wedge-shaped, the narrow portion of the web forming the front end of the casing so that the lenses, located in the sides of the same, are visible alike from the front and from both sides of the vehicle. The housing or casing is adjustably secured to the radiator shield by a bracket of such construction that it is applicable to radiator shields of a variety of sizes, shapes and designs. Means are provided whereby the bracket may be readily attached to or removed from shields having the typical vertical bars whether such bars are disposed close together or spaced well apart.

The driver of the vehicle is relieved of the matter of attention to the signal as it is automatically displayed as he applies the brakes. The reference numeral 1 denotes the casing, preferably wedge-shaped, the narrow end being the front, the sides of the casing being provided with the lenses 2 which are visible from the front of the casing and from both sides thereof, each lens having the word "Go" displayed thereupon and the housing being provided with the usual lamp 3 energized from the battery 4 by the movement of the service brake pedal 5 downwardly. A wire 6 connects the battery 4 to a conductor plate 7 secured to the riser or inclined end of the floor-board 8 adjacent to the brake pedal perforation 9. A second conductor plate 10 arranged upon the riser portion of the floor board upon the remote side of the perforation 9 with relation to the plate 7 is connected by the wire 11 to the lamp 3.

A longitudinally slotted contact link 12 receives a pin 13 through its slotted portion whereby it is movably connected to the shank of the brake pedal, said link being pivotally connected to the plate 7 for contact with the plate 10 in the "on" position of the brake pedal, this position being denoted in dotted lines in Fig. 5 so that a circuit is completed from the battery to the lamp through the wire 6, plate 7, link 12, plate 10 and wire 11 to the lamp to energize the same.

A supporting bracket for the lamp casing includes the angle pieces 13' secured to the rear end of the lamp casing and connected together and adjustably connected to the inner ends of the substantially Y-shaped links 14 by the nut 15 and screw 16, the opposite end of said link being formed with elongated slots 17 through which the screws 18 extend, the heads of said screws being elongated or quite narrow. The width of the heads of the screws is such that they may be passed between the vertical bars 19 of the shield, then turned at right angles to said bars and passed through the slots in the links 14 and the wing nuts 20 then applied to the threaded ends of the screw shanks to bind these links firmly against the bars 19 to support the bracket and lamp casing firmly in position between the same and the screw heads. The bracket is readily removed from the radiator shield by loosening the nuts 20 and removing the screws 18.

While the foregoing is a preferred form of my invention it is to be understood that the same is capable of certain modifications and refinements such as logically fall within the scope of the appended claim, all of which are reserved.

What is claimed is:—

The combination with the vertical bars of the radiator shield of an automobile, of a wedge shaped casing, lenses arranged in the sides of said casing and provided with indicia, and a bracket for adjustably securing said casing to the vehicle, said bracket including angle pieces secured to the rear end of said casing and connected together, Y-shaped links adjustably connected to said angle pieces, said links being formed with elongated slots in one end, screws having elongated heads for passage through said slots and between the shield bars, and wing nuts for said screws.

WALTER HUX HILL.